US012752234B2

(12) United States Patent
McGrail et al.

(10) Patent No.: US 12,752,234 B2
(45) **Date of Patent: *Oct. 6, 2026**

(54) SYSTEM AND METHOD FOR DIRECT AIR CAPTURE OF WATER AND $CO_2$

(71) Applicant: Battelle Memorial Institute, Richland, WA (US)

(72) Inventors: B. Peter McGrail, Pasco, WA (US); Radha K. Motkuri, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 544 days.

This patent is subject to a terminal disclaimer.

(21) Appl. No.: 18/112,314

(22) Filed: Feb. 21, 2023

(65) Prior Publication Data

US 2023/0264138 A1 Aug. 24, 2023

Related U.S. Application Data

(60) Provisional application No. 63/312,677, filed on Feb. 22, 2022.

(51) Int. Cl.
*B01D 53/04* (2006.01)
*B01D 53/047* (2006.01)
(Continued)

(52) U.S. Cl.
CPC ..... *B01D 53/0476* (2013.01); *B01D 53/0438* (2013.01); *B01D 53/261* (2013.01);
(Continued)

(58) Field of Classification Search
CPC ............ B01D 53/0476; B01D 53/0438; B01D 53/04; B01D 53/261; B01D 2253/204;
(Continued)

(56) References Cited

U.S. PATENT DOCUMENTS 4,784,672 A * 11/1988 Sircar ................ B01D 53/0462 95/143
4,793,143 A 12/1988 Rhodes
(Continued)

FOREIGN PATENT DOCUMENTS

CN 103203185 7/2013
CN 108579707 A * 9/2018
(Continued)

OTHER PUBLICATIONS

Machine-generated English translation of CN 108579707 A, published Sep. 28, 2018.*
(Continued)

*Primary Examiner* — Frank M Lawrence, Jr.
(74) *Attorney, Agent, or Firm* — Klarquist Sparkman, LLP

(57) ABSTRACT

An apparatus comprising (A) an atmospheric water extraction unit; and (B) a direct air capture unit positioned downstream of and in communication with the atmospheric water extraction unit, wherein the apparatus is capable of reversibly operating in (i) adsorption mode to adsorb water and $CO_2$ from an incoming air stream and (ii) regeneration mode to release adsorbed water and $CO_2$, wherein the atmospheric water extraction unit comprises a first desiccant bed comprising a sorbent that adsorbs water from an incoming air stream during adsorption mode and releases water during regeneration mode, and wherein the direct air capture unit comprises a first $CO_2$ sorbent bed that adsorbs $CO_2$ from an air stream during adsorption mode and releases $CO_2$ during regeneration.

12 Claims, 2 Drawing Sheets

(51) Int. Cl.
*B01D 53/26* (2006.01)
*B01J 20/22* (2006.01)

(52) U.S. Cl.
CPC .. *B01D 2253/204* (2013.01); *B01D 2257/504* (2013.01); *B01D 2257/80* (2013.01); *B01D 2259/404* (2013.01)

(58) Field of Classification Search
CPC .......... B01D 2257/504; B01D 2257/80; B01D 2259/404; B01D 2258/06; B01D 53/0462; E03B 3/28; Y02C 20/40
USPC ..... 95/95, 96, 106, 114, 115, 117, 121, 126, 95/139; 96/121, 126, 130, 132; 423/230
See application file for complete search history.

(56) References Cited

U.S. PATENT DOCUMENTS

| | | | | | |
|---|---|---|---|---|---|
| 5,914,455 | A * | 6/1999 | Jain | B01D 53/0462 95/122 |
| 6,199,388 | B1 | 3/2001 | Fischer | |
| 10,156,373 | B1 * | 12/2018 | Gulian | F24S 80/00 |
| 10,589,220 | B1 | 3/2020 | Dimaiolo et al. | |
| 2004/0040172 | A1 | 3/2004 | Crawford | |
| 2006/0225569 | A1 | 10/2006 | Schmidt | |
| 2008/0202339 | A1 * | 8/2008 | Nalette | B01D 53/0476 95/120 |
| 2014/0223947 | A1 | 8/2014 | Ranjan et al. | |
| 2015/0182904 | A1 | 7/2015 | Roestenberg | |
| 2016/0123610 | A1 | 5/2016 | Uselton | |
| 2017/0184319 | A1 | 6/2017 | Vandermeulen et al. | |
| 2017/0321909 | A1 | 11/2017 | Davies | |
| 2018/0243680 | A1 * | 8/2018 | Naito | B01D 53/96 |
| 2018/0328601 | A1 | 11/2018 | Weickert et al. | |
| 2019/0176084 | A1 | 6/2019 | Claridge et al. | |
| 2019/0208714 | A1 * | 7/2019 | Johansen | B01D 46/0036 |
| 2020/0001225 | A1 * | 1/2020 | Ritter | C12M 47/18 |
| 2020/0061519 | A1 | 2/2020 | Spiteri et al. | |
| 2021/0055010 | A1 | 2/2021 | McGrail et al. | |
| 2021/0146299 | A1 * | 5/2021 | Besarati | C25B 15/081 |
| 2023/0073553 | A1 * | 3/2023 | Holman | B01D 53/06 |
| 2023/0233989 | A1 * | 7/2023 | McGrail | B01D 53/047 34/282 |
| 2023/0302394 | A1 * | 9/2023 | Marchon | B01D 5/0003 |

FOREIGN PATENT DOCUMENTS

| | | |
|---|---|---|
| CN | 209484741 U | 10/2019 |
| CN | 111182964 | 5/2020 |
| CN | 113 786 818 | 12/2021 |
| JP | 2005-030754 | 2/2005 |
| KR | 10-2020-0009148 | 1/2020 |

OTHER PUBLICATIONS

Burtch et al., Water Stability and Adsorption in Metal-Organic Frameworks, Chemical Reviews 2014, 114, 10575-10612 (2014).*
International Search Report and Written Opinion issued for International Application No. PCT/US2023/011225 on May 10, 2023.
Faishi et al., "Techno-economic assessment of CO2 direct air capture plants," *Journal of Cleaner Production*, vol. 224, pp. 957-980, Mar. 14, 2019.
Final Office Action issued for U.S. Appl. No. 16/993,699 on Aug. 5, 2022.
Fuhrman et al., "Food-energy-water implications of negative emissions technologies in a 1.5 ° C. future," *Nature Climate Change*, vol. 10, pp. 900-927, Aug. 24, 2020.
He et al., "Reversible CO2 capture with porous polymers using the humidity swing," *Energy Environmental Science*, 6(2): 488-493, Dec. 11, 2012.
International Search Report and Written Opinion issued for International Application No. PCT/US2020/058005 on Apr. 28, 2021.
Kain, "A Combined Water and CO2 Direct Air Capture System," U.S. Department of Energy National Energy Technology Laboratory Direct Air Capture Kickoff Meeting, Feb. 24-25, 2021.
Keith et al., "A Process for Capturing CO2 from the Atmosphere," *Joule*, 2(8):1573-1594, Jun. 7, 2018.
Kulkarni et al., "Analysis of Equilibrium-Based TSA Processes for Direct Capture of CO2 from Air," *Ind. Eng. Chem. Res.*, 51(25): 8631-8645, Jun. 18, 2012.
Non-Final Office Action issued for U.S. Appl. No. 16/993,699 on Nov. 29, 2021.
Non-Final Office Action issued for U.S. Appl. No. 16/993,699 on Feb. 3, 2023.
Office Action issued for Taiwan Application No. 109138390 dated Jul. 1, 2022, 7 pages.
Shi et al., "Sorbents for the Direct Air Capture of CO2 from Ambient Air," *Angew. Chem. Int. Edit.* 59(18):6984-7006, Aug. 5, 2019.
U.S. Appl. No. 18/099,550, filed Jan. 20, 2023.
Wang et al., "Moisture Swing Sorbent for Carbon Dioxide Capture from Ambient Air," *Environ. Sci. Technol.*, 45(15): 6670-6675, Jul. 6, 2011.
Wang et al., "Moisture-swing sorption for carbon dioxide capture from ambient air: a thermodynamic analysis," *Phys. Chem. Chem. Phys.* 15(2):504-514, Nov. 5, 2012.
Yang et al., "Humidity-swing mechanism for CO2 capture from ambient air," *Chemical Communications*, 39(54): 4915-4918, Apr. 24, 2018.

* cited by examiner

SYSTEM AND METHOD FOR DIRECT AIR CAPTURE OF WATER AND $CO_2$

CROSS-REFERENCE TO RELATED APPLICATION

This application claims the benefit of the earlier filing date of U.S. Provisional Application No. 63/312,677, filed on Feb. 22, 2022, which is incorporated herein by referenced in its entirety.

ACKNOWLEDGMENT OF GOVERNMENT SUPPORT

This invention was made with government support under Contract No. DE-AC05-76RL01830 awarded by the U.S. Department of Energy. The government has certain rights in the invention.

BACKGROUND

Capture of dispersed greenhouse gases (GHGs) is an important part of a diversified portfolio of technologies to mitigate GHG emissions. A large portion of the 5.2 gigatons (Gt) of $CO_2$ emitted each year in the United States is released in relatively small quantities from distributed sources (e.g., from small point sources or some transportation sources). For such emissions, point source capture may be infeasible. In those cases, capture of dispersed $CO_2$ serves as a crosscutting and complementary approach to achieving economy-wide net-zero emissions.

Industrial direct air capture systems (DAC) are available such as the Climeworks porous sorbent system (Spiteri et al., Patent No. Application US 20200061519 and Carbon Engineering's design around a KOH—$CaCO_3$ process capable of generating 1 MMT or more of $CO_2$ per year (Keith et al., 2018, *Joule* 2(8):1573-1594). As in most current DAC systems, the $CO_2$ recovery process involves introduction of heat (Fasihi et al., 2019, *J. Clean. Prod.* 224:957-980). In sorbent-based systems, the most significant exergetic losses occur from cyclic heating and cooling both the sorbent and the associated mass of heat exchange materials and structural supports. Kulkarni and Sholl 2012, *Ind. Eng. Chem. Res.* 51(25):8631-8645) estimated a second law efficiency of 7.4% for a typical temperature swing adsorption (TSA) DAC system, which might be improved to about 11.6% with a higher capacity sorbent. From the detailed thermodynamic analysis provided by Keith et al. (2018) for the Carbon Engineering design, one arrives at a second law efficiency of 8.3% including CO2 compression to 150 bar. However, this estimate does not include the total energy (or environmental) cost of supplying the 4.7 tons of water consumed for every ton of $CO_2$ produced in the process. Indeed, in a recent paper by Fuhrman et al. (2020) *Nat. Clim. Chang.* 10:920-927, water consumption from deployment of conventional DAC technology was shown to have multiple negative economic impacts offsetting the climate change mitigation benefits of DAC to a significant degree.

SUMMARY

Disclosed herein is an apparatus comprising:

(A) an atmospheric water extraction unit; and (B) a direct air capture unit positioned downstream of and in communication with the atmospheric water extraction unit, wherein the apparatus is capable of reversibly operating in (i) adsorption mode to adsorb water and $CO_2$ from an incoming air stream and (ii) regeneration mode to release adsorbed water and $CO_2$, wherein the atmospheric water extraction unit comprises a first desiccant bed comprising a sorbent that adsorbs water from an incoming air stream during adsorption mode and releases water during regeneration mode, wherein the direct air capture unit comprises a first $CO_2$ sorbent bed that adsorbs $CO_2$ from an air stream during adsorption mode and releases $CO_2$ during regeneration.

Also disclosed herein is a method comprising operating the above-described apparatus in (A) adsorption mode to remove water and $CO_2$ from a first air stream and (B) regeneration mode to release adsorbed water and $CO_2$, wherein adsorption mode comprises:

(A) contacting the first air stream with the first desiccant bed to reduce the water content of the stream and create a second air stream having a reduced water content relative to the first stream;

(B) contacting the second air stream with the first $CO_2$ sorbent bed to reduce the $CO_2$ content of the stream and create a third stream having a reduced $CO_2$ content relative to the first and second air streams; and (C) exhausting the third stream to ambient atmosphere;

wherein regeneration mode comprises:

(a) releasing water adsorbed by the first desiccant bed;

(b) applying heat and/or change in pressure to the first $CO_2$ sorbent bed to release $CO_2$;

(c) combining the water released by the first desiccant bed and the $CO_2$ released by the first $CO_2$ sorbent bed to create a discharge stream comprising water vapor and $CO_2$; and (d) passing the discharge stream through one or more condensers and compressors to create (i) a liquid water condensate discharge and (ii) a $CO_2$ stream.

The foregoing and other objects, features, and advantages will become more apparent from the following detailed description, which proceeds with reference to the accompanying figures.

DETAILED DESCRIPTION

Figure 1:
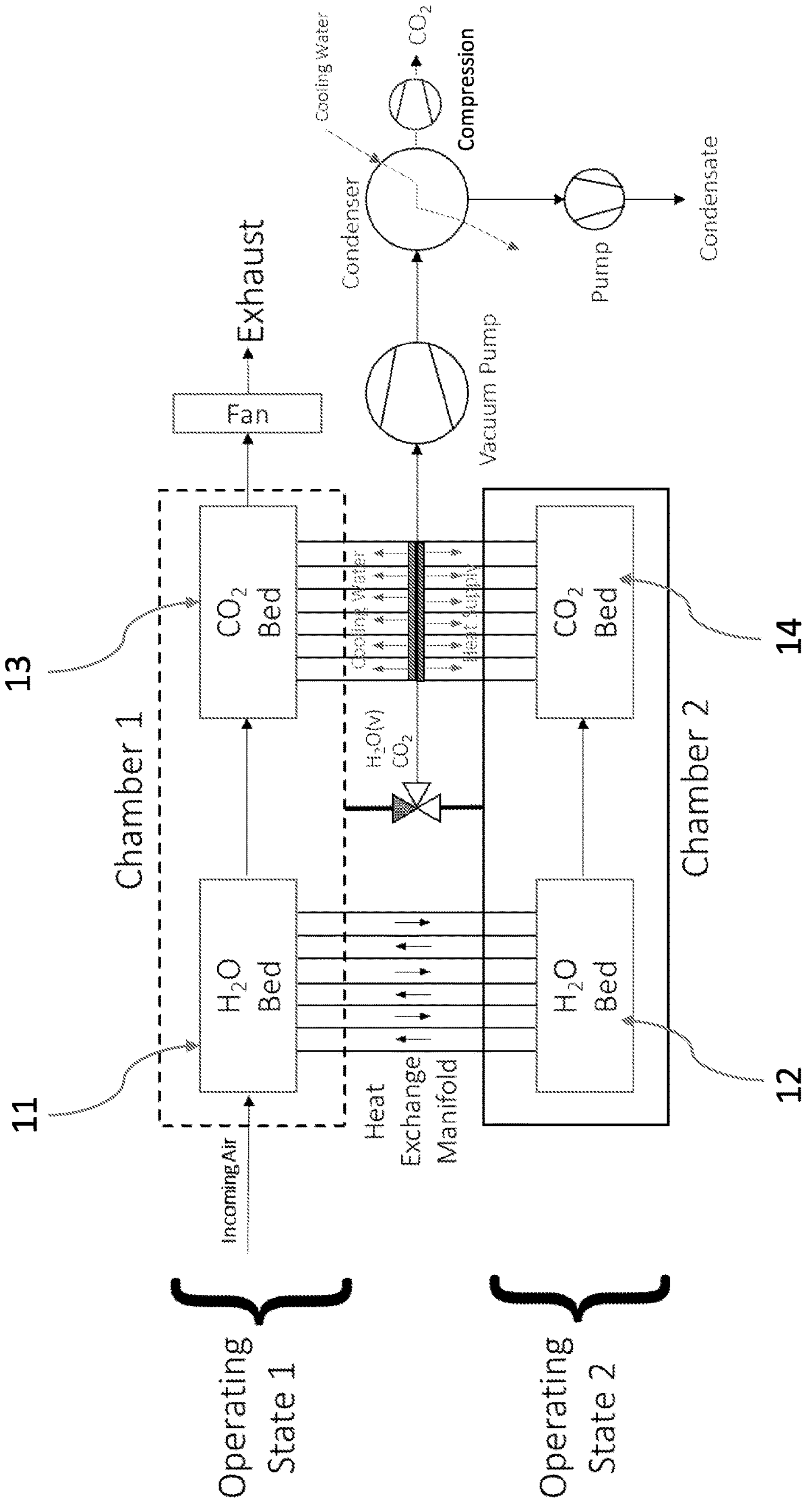
FIG. 1 is a schematic of an embodiment of a hybrid direct air capture (HDAC) system disclosed herein that utilizes atmospheric water extraction (AWE) coupled with $CO_2$ temperature and pressure swing adsorption (TPSA).

The hybrid direct air capture (HDAC) systems and methods disclosed herein simultaneously overcome the largest barriers that drive up costs for conventional DAC systems: 1) complex and numerous unit operations that incur high capital and operating costs, 2) low thermodynamic efficiency and consequent high energy consumption per ton of $CO_2$ produced, and 3) high consumption of water, which may constrain deployment in water-challenged locations. The HDAC systems and methods disclosed herein simultaneously capture $CO_2$ and water from air. The HDAC systems and methods produce a large amount of potable water along with $CO_2$, which enhances siting options where water scarcity is an issue, provides a second source of revenue that improves financial returns, and magnifies the environmental benefits of removing $CO_2$ from the atmosphere. The high purity water produced by the HDAC systems and methods can also be used directly as a feedstock for electrolysis producing hydrogen, which along with the $CO_2$ produced, can be used to produce carbon neutral, or low carbon footprint fuels. As described below in detail, the HDAC systems and methods disclosed herein have a small number of unit operations, thereby simplifying the overall process. In certain embodiments, the HDAC systems and method disclosed herein have an overall $CO_2$ capture efficiency of at least 50%, more particularly at least 60%, and an overall water removal efficiency of at least 50%, more particularly at least 65%.

The systems and methods disclosed herein combine atmospheric water extraction (AWE) with $CO_2$ adsorption.

In one embodiment, HDAC combines atmospheric water extraction (AWE) with $CO_2$ temperature and pressure swing adsorption (TPSA). An example of such a system in shown in FIG. 1. Operating State 1 represents the adsorption cycle where water and $CO_2$ are captured from ambient air. First, humid air flows over a desiccant bed that removes moisture. In certain embodiments, sufficient water is removed to reduce the relative humidity (RH) of the air stream from ambient RH to preferably between 30 to 15% RH. The low relative humidity (RH) air stream then enters the second set of sorbent beds selective for $CO_2$ removal. In certain embodiments, the $CO_2$ sorbents are designed to remove ≥50% of the $CO_2$ from the air stream. The dry and $CO_2$-depleted air stream is then exhausted to ambient. In Operating State 2 (FIG. 1), a parallel set of desiccant beds is isolated from the air stream and simultaneously regenerated under a partial vacuum. The desiccant beds in Operating State 1 and 2 are thermally coupled to increase thermal efficiency of water removal. Heat integration provides a highly efficient and passive heat transfer mechanism to "cancel" the heat of water vapor adsorption generated in the active desiccant bed with the endothermic heat of desorption consumed in the desiccant bed undergoing regeneration. Air exiting the desiccant beds thus remains near ambient temperature.

Operating State 2, shown in FIG. 1, represents the desorption or regeneration cycle where water and $CO_2$ are recovered from the desiccant and $CO_2$ beds. In one embodiment, the chamber is first evacuated to below 100 mbar. The desiccant and $CO_2$ beds begin to release the adsorbed water and $CO_2$. In one embodiment, the $CO_2$ bed is heated to a temperature between 50 and 100° C. to facilitate desorption of $CO_2$. Heat recovered from the $CO_2$ compressor system can be supplemented with an external low-grade heat source (waste heat, solar, or resistance heating) to supply the required heat to regenerate the $CO_2$ sorbents. Using this design approach, the system can capture $CO_2$ with a zero or low-carbon footprint. The vacuum pump provides suction on both the desiccant and $CO_2$ sorbent beds during the regeneration cycle. The vacuum pump discharges the combined water vapor and $CO_2$ stream at sufficient pressure to condense the majority of the water out of the stream in a condener downstream of the vacuum pump. Condensate is pumped up to atmospheric pressure for discharge (consuming trivial additional energy). In one embodiment, the gaseous $CO_2$ and residual water vapor leaving the condenser can be compressed and passed through a second condenser stage to remove additional water. In one embodiment, a third compressor and condenser stage is used to further reduce the water content in $CO_2$ stream. The $CO_2$ stream is then compressed to a pressure slightly above atmospheric pressure or may be compressed further for storage or pipeline transport. In one embodiment, the $CO_2$ stream is passed through a dehydrator to remove residual water sufficiently to achieve commercial pipeline specification of <500 ppmv water. The dry $CO_2$ is then compressed up to a desired pipeline pressure such as between 60 to 100 bar.

At the conclusion of the regeneration cycle, the chamber in Operating State 2 is switched to Operating State 1 and vice versa. The cycle time for the system may range between 90 to 1200 s, with the preferred cycle time between 300 to 600 s.

In another embodiment, HDAC combines atmospheric water extraction (AWE) with $CO_2$ moisture swing adsorption (MSA), as described in U.S. Provisional Application No. 63/303,407, filed Jan. 26, 2022, assigned to the same assignee as the present application and hereby incorporated by reference.

Atmospheric Water Extraction (AWE) Section

The AWE section of the systems disclosed herein includes one or more nanostructured desiccant porous materials configured to adsorb water from the air inlet stream at a first pressure and to release water from that material when subjected to a second pressure with the second pressure lower than the first air pressure. A preferred embodiment for the first pressure is at ambient air pressure with the second pressure being a partial vacuum between 10 to 50 mbar depending upon ambient air temperature. A second embodiment would have a first pressure above ambient such as between 2 to 4 bar while the second pressure is at ambient pressure.

Preferably, the desiccant materials are located within a structured support such as a desiccant bed, although other configurations including 3D arrangements including configuration in rods, coatings on fins or other structures are also envisioned in certain applications. Multiple numbers of these structures can be interconnected with or without connection to other features such as heat pipes, heat exchange tubes, or seals. Desiccants with different adsorption properties may be assembled in sequence along the air flow path to optimize water extraction from the air stream. In a preferred embodiment, a vacuum pump is connected to the system and is adapted to provide suction to the desiccant materials sufficient to lower the pressure and remove water from desiccants thus regenerating the adsorption material. In a second embodiment, an air compressor is used to supply air at the first pressure, which flows through the desiccant beds under pressure. An expander may be included to recover some of the compression energy from the exhaust. Regeneration occurs at the second pressure, which may range between 100 mbar and ambient atmospheric pressure.

In some embodiments, the desiccant materials may be a metal-organic framework (MOF) material, zeolite, mesoporous silica, material, or porous carbon. The MOFs are porous metal-organic frameworks or hybrid organic inorganic materials that include at least one metal component selected from the group consisting of Zn, Fe, Al, Mg, V, Ni, Mn, Co, Sc, Y, Ti, Zr, Hf, Nb, Ta, Cr, Mo, W, Tc, Re, Ru, Os, Ir, Pd, Pt, Cu, Ag, Au, Hg, Sr, Ba, Ga, In, Tl, Si, Ge, Sn, Pb, Sb, Bi, and combinations thereof.

Divalent metal ions including $Ni^{+2}$, $zn^{+2}$, $cu^{+2}$, $cO^{+2}$, $mg^{+2}$, $ca^{+2}$, $Fe^{+2}$, $Mn^{+2}$, and the like, and trivalent metal ions such as $Fe^{+3}$, $Al^{+3}$, $Cr^{+3}$, $Mn^{+3}$, and the like, may be incorporated in the metal-organic frameworks. In another embodiment, the porous metal organic frameworks may be formed by coordination with tetravalent, pentavalent or hexavalent metal ions of Zr, Ti, Sn, V, W, Mo or Nb.

In certain embodiments, along with univalent metals ions, mixed metals containing divalent, trivalent oxidation states are incorporated in metal organic frameworks also known as Prussian blue analogues with chemical formula of $M^{+3}{}_3[M^{+2}(CN)_6]_2$ where $M^{+3}$ can be $Fe^{+3}$, $CO^{+3}$, $Mn^{+3}$ etc and $M^{+2}$ can be $Zn^{+2}$, $Ni^{+2}$, $Co^{+2}$, $Mn^{+2}$, $cu^{+2}$ and the like, and mixtures thereof.

An organic building block in the porous metal organic framework materials is referred to as a linker or organic linker. In one embodiment, the organic linker has a functional group capable of coordination. Examples of functional groups that can be coordinated with these metal ions include but are not limited to, carbonic acid (—$CO_3H$), anionic form of carbonic acid (—$CO_3^-$), carboxyl anion group of carboxylic acid, amino group (—$NH_2$), imino group, hydroxyl group (—OH), amido group (—$CONH_2$), sulfonic acid group (—$SO_3H$), anionic form of sulfonic acid (—$SO_3$), cyanide (—CN), nitrosyl (—NO), and pyridine. For example, in one embodiment the chemical formula T[Fe(CN)$_5$NO] where T=Mn, Fe, Co, Ni, Cu, Zn, and Cd; also mixed compositions include $Co_{1-x}T_x[Fe(CN)_5NO]$; T=Mn, Fe, Ni, Zn, and Cd etc. also known as nitroprussides.

In certain embodiments, the organic ligand may include compounds having at least two sites for coordination, for example, bi-, tri-, tetra-, penta-, hexadentate ligands. Non-limiting examples of these organic compounds may be a neutral linker such as pyrazine, dabco, piperazine, bypyridine, azobenzene and functionalized forms of these neutral ligands etc., anionic organic compounds including anions of carboxylic acid such as, terephthalate, naphthalenedicarboxylate, benzenetricarboxylate, benzenetetracarboxylate, benzenepentacarboxylate, benzenehexacarboxylate, dioxoterephthalate, etc. Anions of aromatic and other linear carboxylic acid anions include formate, oxalate, malonate, succinate, glutamate etc., and nonaromatic carboxylate anions including 1,2-cyclohexanedicarboxylate, 1,3-cyclohexanedicarboxylate, 1,4-cyclohexanedicarboxylate and 1,3,5 cyclohexane tricarboxylate can be used to prepare the hybrid organic inorganic materials.

Other organic linkers including various heterocyclic materials including, furan, indole, pyridine-2,3-dicarboxylate, pyridine-2,6-dicarboxylic acid, pyridine-2,5-dicarboxylic acid and pyridine-3,5-dicarboxylicacid, and the like.

Other organic linkers to produce a sub-class of metal organic frameworks called zeolite imidazolate frameworks generated using imidazole, tetrazole, triazole, and functionalized with Cl, Br, I, F, $NH_2$, and $NO_2$.

In another embodiment, the organic ligand can be dihydroxyterephthalate and its derivatives. In a non-limiting example, dihydoxyterephthalate having, chloro, bromo, iodo, fluoro, cyano, sulphonato, amino, aldehyde, and carbamide. Similarly, organic building blocks can be functionalized with di-, tri-, tetra,-pentaterephthalate containing at least one or more functional groups such as nitro, amino, bromo, chloro, iodo, and amino In certain embodiments, the desiccant comprises a covalent organic framework.

Covalent organic frameworks (COFs) or porous aromatic frameworks (PAFs) or porous polymer networks (PPNs) are porous crystalline extended aromatic framework materials where the organic building blocks are linked by strong covalent bonds. The attractiveness behind these materials was exclusively use of light elements such as H, B, C, N and O which are known to form well established materials (ex: graphite, diamond, boron nitride etc) with strong covalent bonds. The fine tunability of the organic building block with various functional groups, extending the size, lead to the formation of lightweight functionalized micro/meso porous covalent frameworks with desired applications. Covalent organic framework type materials include those generated by condensation of diboronic acid, hexahydroxytriphenylene, dicyanobenzene and its derivatives of chemical formula $C_9H_4BO_2$, and those generated from benzene-1,4-diboronic acid (BDBA), 2,3,6,7,10,11-hexahydroxyltriphenylene (HHTP), tetrakis(4-bromophenyl)methane, Tetrakis (4-ethynylphenyl)methane (TEPM), 1,3,5,7-Tetrakis(4-ethynylphenyl)adamantine (TEPA), 1,3,5,7-Tetrakis(4-bromophenyl)adamantine (TBPA).

In certain embodiments, the desiccant is MOF 303, 801, or 841, with MOF 303 or 801 showing the best performance in some circumstances. MOF 303 is an aluminum-based MOF. MOF 801 and MOF 841 are zirconium-based MOFs.

A preferred embodiment provides pairs or sets of desiccant beds or other structures within an air passage pathway that allows for contact between the humid air and the desiccant materials. The air continually dries while moving across these structures. This can allow for serial drying and increased efficiencies by use of different desiccants that adsorb water more effectively from air at higher relative humidity versus others that are more effective at lower relative humidity. In addition, the passageways to these structures can be opened and closed to allow for one set to be in a dehumidifying operation at the first operating pressure while in another section water is removed from the system and the desiccant regenerated at the second operating pressure.

The water adsorbed by the desiccant materials spontaneously results in the generation of heat, which can be as much as 3000 kJ/kg-$H_2O$ or even more with some desiccants. An equal and opposite amount of heat is consumed when water is removed from the desiccants during regeneration. In a preferred embodiment, the heat of adsorption is used to enhance regeneration of the desiccant materials by providing the heat required during regeneration at the second operating pressure in the apparatus. Heat can be conveyed to these materials passively though interconnected heat pipes, or actively by pumping a heat transfer fluid through tubes, plates, pipes or other means of conveying a heat transfer fluid from the parts of the system undergoing adsorption to the beds or structures that are undergoing regeneration. In a preferred embodiment, the desiccant materials are bonded to a thermally conductive support such as aluminum that provides: 1) Efficient conveyance of the heat of adsorption/desorption to the heat pipes or other heat transfer system used to interconnect the parts of the system, and 2) Efficient exposure of the desiccant materials to the air stream to increase rate of water uptake.

Figure 2:
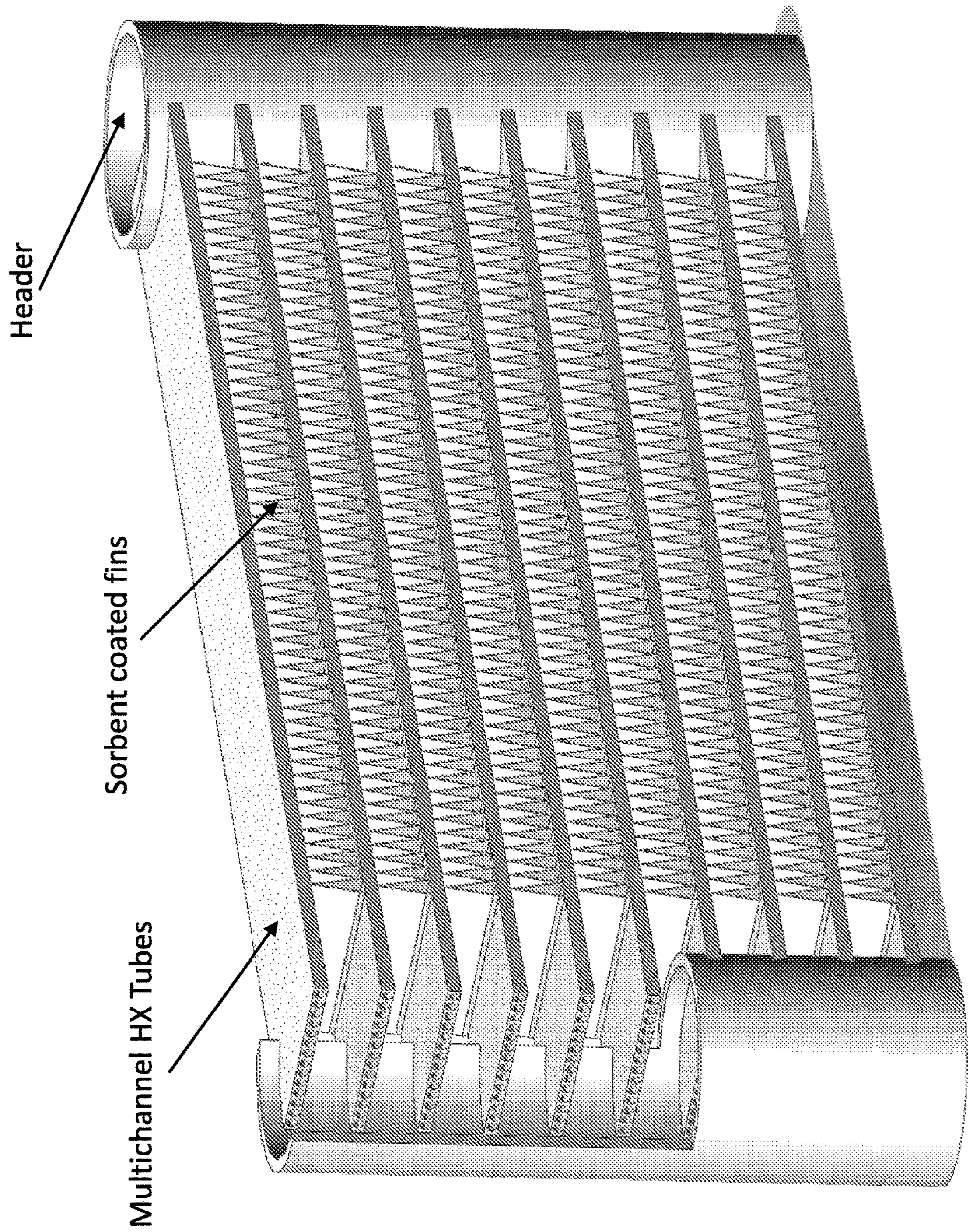
FIG. 2 is a perspective view of a radiator design for beds disclosed herein.

FIG. 2 shows an example of a tube-fin design sorbent bed system formed similarly to a radiator with a set of thermally conductive fins made of a very lightweight material like aluminum coated with sorbent. As air flows through the channels between the fins and water is adsorbed by the desiccants generating heat, the tubes convey a heat transfer fluid to a header that is connected to an identical set of desiccant beds undergoing regeneration and thus consuming heat. A heat transfer simulation of this design shows that with sufficient flow rate of heat transfer fluid, temperature differential between the chambers can be kept below 5° C. This confirms the design premise in being able to thermally couple the adsorption-desorption chambers and operate the AWE system approximately isothermally. The same radiator-style design also provides means to convey a warm heat transfer fluid to the $CO_2$ beds during regeneration.

Direct Air Capture (DAC) Section—Temperature and Pressure Swing Adsorption (TPSA)

In one embodiment illustrated in FIG. 1, the HDAC system design merges AWE with TPSA into two chambers or trains with a first train that is capturing water and $CO_2$ from the air flow, while a second opposing train is being regenerated. In the embodiment shown in FIG. 1, the first train includes a first desiccant bed 11 and a first $CO_2$ adsorbent bed 13, and the second train includes a second desiccant bed 12 and a second $CO_2$ adsorbent bed 14. This provides for continuous production of $CO_2$ and water and utilizes the heat exchange principles described previously in the AWE section to balance the heat requirements between the chambers. Heat is also conveyed in this embodiment to the $CO_2$ beds undergoing regeneration.

The apparatus in FIG. 1 also includes a $CO_2$ TPSA section that includes a first $CO_2$-capture bed 13 and a second $CO_2$-capture bed 14. The first water-capture bed 11 and the second water-capture bed 12 each contain a desiccant as described above.

The first $CO_2$-capture bed 13 and the second $CO_2$-capture bed 14 each contain a $CO_2$ selective TPSA.

In certain embodiments, each of the first train and the second train may be annular passages through which flowing air can contact the desiccant and the $CO_2$ TPSA. The first train and the second train may be arranged so that they are parallel to each other.

The desiccant and the $CO_2$ TPSA are arranged relative to the location of the air inlet so that incoming air flows through the first train or the second train in the following sequence: primary desiccant, any secondary desiccants (if used), a primary $CO_2$ TPSA, and any secondary $CO_2$ TPSA (if used). In other words, the primary desiccant is proximate to the air inlet and the $CO_2$ TPSA is proximate to the exhaust.

The apparatus includes at least one air inlet. An air flow diverter may be disposed at the air inlet for directing the incoming air flow into the first train or the second train depending on the respective regeneration states of the primary desiccant and the $CO_2$ TPSA.

The apparatus includes at least one exhaust outlet. Air that has been passed through the desiccant beds and the $CO_2$ TPSA is exhausted from the apparatus via the exhaust outlet. A low relative humidity (RH) air stream exiting the desiccant beds then enters the $CO_2$-selective adsorbent beds. In certain embodiments, 50 to 60, more particularly 60 to 70, percent of the $CO_2$ is removed by the $CO_2$ adsorbent. In certain embodiments the $CO_2$ adsorbent is regenerated at 50° C. to 100° C., more particularly 65° C. to 85° C. Heat can be recovered from a $CO_2$ compressor system and is supplemented with an external low-grade heat source (waste heat, solar, or resistance heating) to thermally regenerate the $CO_2$ sorbents. The warm/dry air stream is then exhausted to ambient. The system can capture $CO_2$ with a zero or low-carbon footprint.

To perform regeneration, a preferred embodiment implements a seal on one chamber where a partial vacuum is applied. A seal may be formed using any of a variety of methods that include swinging, sliding, or rotating a door to seat against a sealing material, such as an O-ring, gasket, flange, or other sealing material. In an example of one embodiment that allows switching seals between trains to cycle operating states, vacuum applied to the train with a door seated against the seal causes compression of the door and sealing material to form an air-tight seal. After evacuation of residual air from the train, the drop in pressure causes water vapor to desorb from the desiccants. By placing an intake manifold between the desiccant bed 12 and the $CO_2$ adsorbent bed 14, the desorbed water exits the chamber without contacting the $CO_2$ adsorbent bed. The $CO_2$ TPSA bed is simultaneously heated to a temperature between 50 and 100° C. causing the $CO_2$ to be released. The water and $CO_2$ then flow up to the manifold and are removed from the chamber by the vacuum pump.

The vacuum pump provides suction on both the desiccant and TPSA beds during the regeneration cycle and is used to provide modest compression to raise the vapor pressure sufficiently to condense most of the water out. This minimizes the energy consumption required to raise the remaining $CO_2$ gas up to atmospheric pressure or higher pressure for storage or transport via pipeline.

The $CO_2$-TPSA is a physi-sorbent, a chemi-sorbent or a combination thereof. In some embodiments, the sorbent is an amine-functionalized chemi-sorbent.

In certain embodiments, the $CO_2$-TPSA is a solid sorbent known as self-assembled monolayers on mesoporous supports (SAMMS).

Since their unveiling in 1992, mesoporous ceramics have inspired substantial interest, especially by adding self-assembling monolayer compounds to the surface(s) of the mesopores. By varying the terminal group of the self-assembling monolayer, various chemically functionalized materials have been prepared. A mesoporous material is defined as a material, usually catalytic material, having pores with a diameter or width range of 2 nanometers to 0.05 micrometers.

Exemplary of use of self-assembling monolayer(s) on a mesoporous material is the International Application Publication WO 98/34723. The self-assembling monolayer(s) is made up of a plurality of assembly molecules each having an attaching group. For attaching to silica, the attaching group may include a silicon atom with as many as four attachment sites, for example, siloxanes, silazanes, and chlorosilanes. Alternative attaching groups include metal phosphate, hydroxamic acid, carboxylate, thiol, amine and combinations thereof for attaching to a metal oxide; thiol, amine, and combinations thereof for attaching to a metal; and chlorosilane for attaching to a polymer. A carbon chain spacer or linker extends from the attaching group and has a functional group attached to the end opposite the attaching group.

The adsorbent includes a porous support (substrate) of a preselected porous material that includes pores of a preselected size, pore volume, and surface area. The porous support is composed of a preselected material including, but not limited to, e.g., metals, transition metals, main group metalloids, metal oxides, ceramic oxides, oxide coated materials, metal silicates, including combinations of these porous materials. The porous support includes pores with a pore size of from about 30 angstroms to about 500 angstroms. The porous support further includes a pore volume that is greater than or equal to about 0.5 cc/g. More particularly, the pore volume is in the range from about 1 cc/g to about 3 cc/g, but is not limited thereto. Porous support includes a specific pore surface area greater than or equal to about 150 $m^2/g$. More particularly, specific pore surface area is in the range from 200 $m^2/g$ to about 1500 $m^2/g$.

In certain embodiments, the SAMMS is an amine-functionalized sorbent on a mesoporous silica support. The sorbent forms an ammonium carboxylate upon interaction with $CO_2$, prompting its capture even at low $CO_2$ partial pressures (e.g., $<0.4$ mbar). This SAMMS is formed using a Davisil® (or equivalent) silica substrate with diethylenetriamine (DETA) functionalization applied.

The $CO_2$ adsorbent bed system may be in the form of a radiator with a set of thermally conductive fins made of a lightweight material (e.g., aluminum). The fins are coated with the adsorbent. Air flows through the channels between the fins as illustrated in FIG. 2.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. An apparatus comprising:

(A) an atmospheric water extraction unit; and (B) a direct air capture unit positioned downstream of and in communication with the atmospheric water extraction unit, wherein the apparatus is capable of reversibly operating in (i) adsorption mode to adsorb water and $CO_2$ from an incoming air stream and (ii) regeneration mode to release adsorbed water and $CO_2$, wherein the atmospheric water extraction unit comprises a first desiccant bed comprising a sorbent that adsorbs water from an incoming air stream during adsorption mode and releases water during regeneration mode, and a second desiccant bed, the second desiccant bed comprising a sorbent that adsorbs water from an incoming air stream during adsorption mode and releases water during regeneration mode, wherein the direct air capture unit comprises a first $CO_2$ sorbent bed that adsorbs $CO_2$ from an air stream during adsorption mode and releases $CO_2$ during regeneration, and a second $CO_2$ sorbent bed, the second $CO_2$ sorbent bed comprising a sorbent that adsorbs $CO_2$ from an air stream during adsorption mode and releases $CO_2$ during regeneration mode, wherein the apparatus is configured such that the first desiccant bed and the first $CO_2$ sorbent bed form a first train and the second desiccant bed and the second $CO_2$ sorbent bed form a second train that is separate from the first train, wherein the first and second trains are capable of reversibly operating in (i) adsorption mode to adsorb water and $CO_2$ from an incoming air stream and (ii) regeneration mode to release adsorbed water and $CO_2$, wherein the first and second trains are configured such that the first train operates in adsorption mode when the second train operates in regeneration mode and the second train operates in adsorption mode when the first train operates in regeneration mode, and wherein the first desiccant bed is thermally coupled to the second desiccant bed, and the first $CO_2$ sorbent bed is not thermally coupled to the second $CO_2$ sorbent bed.

2. The apparatus of claim 1 wherein the first desiccant bed comprises a nanostructured porous material that adsorbs water from an air stream at a first pressure and releases water when subjected to a second pressure wherein the second pressure is lower than the first pressure.

3. The apparatus of claim 2 wherein the nanostructured porous material comprises a metal-organic framework material.

4. The apparatus of claim 3 wherein the metal-organic framework material is selected from the group consisting of Fe-MIL-100, MOF-303, MOF-801, MOF-841, and combinations thereof.

5. The apparatus of claim 1 wherein the first $CO_2$ sorbent bed comprises a physi-sorbent, a chemi-sorbent, or combination thereof.

6. The apparatus of claim 1 wherein the first $CO_2$ sorbent bed comprises an amine-functionalized chemi-sorbent.

7. The apparatus of claim 1 wherein the first $CO_2$ sorbent bed comprises a self-assembled monolayers on mesoporous supports (SAMMS) sorbent.

8. The apparatus of claim 1 wherein the first and second trains are sealed from each other.

9. The apparatus of claim 1 wherein at least one heat transfer pipe thermally couples the first desiccant bed to the second desiccant bed.

10. The apparatus of claim 1 further comprising a vacuum source alternately in communication with the first desiccant bed and then the second desiccant bed.

11. A method comprising operating the apparatus of claim 1 in (A) adsorption mode to remove water and $CO_2$ from a first air stream and (B) regeneration mode to release adsorbed water and $CO_2$, wherein the adsorption mode comprises:

(A) contacting the first air stream with the first desiccant bed to reduce the water content of the stream and create a second air stream having a reduced water content relative to the first stream;

(B) contacting the second air stream with the first $CO_2$ sorbent bed to reduce the $CO_2$ content of the stream and create a third stream having a reduced $CO_2$ content relative to the first and second air streams; and (C) exhausting the third stream to ambient atmosphere;

wherein the regeneration mode comprises:

(a) releasing water adsorbed by the first desiccant bed;

(b) applying heat and/or change in pressure to the first $CO_2$ sorbent bed to release $CO_2$;

(c) combining the water released by the first desiccant bed and the $CO_2$ released by the first $CO_2$ sorbent bed to create a discharge stream comprising water vapor and $CO_2$; and (d) passing the discharge stream through one or more condensers and compressors to create (i) a liquid water condensate discharge and (ii) a $CO_2$ stream.

12. The method of claim 11 comprising operating the apparatus such that the first train operates in adsorption mode when the second train operates in regeneration mode and the second train operates in adsorption mode when the first train operates in regeneration mode.

* * * * *